United States Patent
McKay et al.

(10) Patent No.: US 7,863,213 B2
(45) Date of Patent: Jan. 4, 2011

(54) SUPPORTED POLYMERIZATION CATALYSTS

(75) Inventors: Ian McKay, Calgary (CA); Dusan Jeremic, Calgary (CA); Grant Berent Jacobsen, Tervuren (BE); Sergio Mastroianni, Brussels (BE)

(73) Assignee: Nova Chemicals (International) S.A. (CH)

( * ) Notice: Subject to any disclaimer, the term of this patent is extended or adjusted under 35 U.S.C. 154(b) by 803 days.

(21) Appl. No.: 11/800,773

(22) Filed: May 7, 2007

(65) Prior Publication Data

US 2008/0045406 A1    Feb. 21, 2008

(30) Foreign Application Priority Data

May 30, 2006    (GB)    ................. 0610667.8

(51) Int. Cl.
*C08F 4/6592*    (2006.01)
*B01J 31/22*    (2006.01)
*B01J 31/14*    (2006.01)

(52) U.S. Cl. ............... 502/155; 502/103; 502/120; 502/152; 526/129; 526/133; 526/134; 526/161; 526/943

(58) Field of Classification Search ............ 502/103, 502/120, 152, 155; 526/129, 133, 134, 161
See application file for complete search history.

(56) References Cited

U.S. PATENT DOCUMENTS

| | | | |
|---|---|---|---|
| 6,271,165 B1 * | 8/2001 | Jacobsen et al. | 502/104 |
| 6,750,170 B2 * | 6/2004 | Hoang et al. | 502/103 |
| 2006/0205900 A1 * | 9/2006 | Windmuller et al. | 526/160 |

FOREIGN PATENT DOCUMENTS

| | | |
|---|---|---|
| EP | 0 089 691 B1 | 11/1989 |
| EP | 0 516 479 A3 | 12/1992 |
| EP | 0 338 044 B1 | 11/1994 |
| EP | 0 416 815 B1 | 8/1997 |
| EP | 0 699 213 B1 | 2/1998 |
| EP | 0 420 436 B2 | 7/2000 |
| EP | 0 642 536 B1 | 11/2001 |
| EP | 0 129 368 B2 | 4/2002 |
| EP | 0 206 794 B2 | 8/2002 |
| EP | 0 418 044 B2 | 8/2003 |
| EP | 0 551 277 B2 | 3/2005 |
| WO | WO 95/00526 | 6/1994 |
| WO | WO 94/26793 | 11/1994 |
| WO | WO 95/07939 | 3/1995 |
| WO | WO 96/04290 | 7/1995 |
| WO | WO 96/00245 | 1/1996 |
| WO | WO 96/04318 | 2/1996 |
| WO | 97/02297 | 1/1997 |
| WO | WO 98/27119 | 6/1998 |
| WO | WO 02/06357 A1 | 1/2002 |
| WO | WO 2005/005496 * | 1/2005 |

OTHER PUBLICATIONS

Joseph B. Lambert, et al., Silyl Cations in the Solid and in Solution, Organometallics, Dept. of Chem., Northwestern Univ., Evanston, IL, USA, Jan. 1994, vol. 13, pp. 2430-2443.
Joseph B. Lambert, et al, Tetrakis (pentaflourophenyl) borate: a New Anion . . . , Chem Society, Chem Community, Dept. of Chem, Northwestern Univ, Evanston, IL, USA, 1993, p. 383.

* cited by examiner

*Primary Examiner*—Caixia Lu
(74) *Attorney, Agent, or Firm*—Kenneth H Johnson

(57) ABSTRACT

A supported catalyst for olefin polymerization comprises a selected ionic activator, a selected organometallic catalyst and a support material. The selected activator must contain an active hydrogen moiety. The organometallic catalyst is characterized by having a phosphinimine ligand and a substituted cyclopentadienyl ligand (which contains from 7 to 30 carbon atoms). The supported catalyst exhibits excellent activity in gas phase olefin polymerizations and may be used under substantially "non-fouling" polymerization conditions.

2 Claims, No Drawings

SUPPORTED POLYMERIZATION CATALYSTS

FIELD OF THE INVENTION

The present invention relates to supported catalysts suitable for the polymerization of olefins and in particular to supported metallocene catalysts providing advantages for operation in gas phase and slurry processes.

BACKGROUND OF THE INVENTION

In recent years there have been many advances in the production of polyolefin homopolymers and copolymers due to the introduction of metallocene catalysts.

Metallocene catalysts offer the advantage of generally a higher activity than traditional Ziegler catalysts and are usually described as catalysts which are single site in nature.

There have been developed several different families of metallocene complexes. In earlier years catalysts based on bis (cyclopentadienyl) metal complexes were developed, examples of which may be found in EP 129 368 or EP 206 794. More recently complexes having a single or mono cyclopentadienyl ring have been developed. Certain of such mono-cyclopentadienyl complexes have been referred to as constrained geometry complexes and examples of these complexes may be found in EP 416 815 or EP 420 436. In both of these complexes the metal atom e.g. zirconium is the highest oxidation state.

Other complexes however have been developed in which the metal atom may be in a reduced oxidation state. Examples of both the bis (cyclopentadienyl) and mono(cyclopentadienyl) complexes have been described in WO 96/04290 and WO 95/00526 respectively.

The above metallocene complexes are utilized for polymerization in the presence of a cocatalyst or activator. Typically activators are aluminoxanes, in particular methyl aluminoxane or compounds based on boron compounds. Examples of the latter are borates such as trialkyl-substituted ammonium tetraphenyl or tetrafluorophenyl borates. Catalyst systems incorporating such borate activators are described in EP 516 479, EP 418 044 and EP 551 277.

The above metallocene complexes may be used for the polymerization of olefins in solution, slurry or gas phase. When used in the gas phase the metallocene complex and/or the activator are suitably supported. Typical supports include inorganic oxides (e.g. silica or alumina) or polymeric supports may alternatively be used.

Examples of the preparation of supported metallocene catalysts for the polymerization of olefins may be found in WO 94/26793, WO 95/07939, WO 96/00245, WO 96/04318, WO 97/02297 and EP 642 536.

WO 98/27119 describes supported catalyst components comprising ionic compounds comprising a cation and an anion in which the anion contains at least one substituent comprising a moiety having an active hydrogen. In this disclosure supported metallocene catalysts are exemplified in which the catalyst is prepared by treating the aforementioned ionic compound with a trialkylaluminum compound followed by subsequent treatment with the support and the metallocene.

WO 98/27119 also describes a method for activating a substantially inactive catalyst precursor comprising (a) an ionic compound comprising a cation and an anion containing at least one substituent comprising a moiety having an active hydrogen; (b) a transition metal compound; and optionally (c) a support by treatment with an organometallic compound thereby forming an active catalyst.

Various methods have been utilized to prepare supported catalysts of this type.

For example, WO 98/27119 describes several methods of preparing the supported catalysts disclosed therein in which the support is impregnated with the ionic compound. The volume of the ionic compound may correspond from 20 volume percent to greater than 200 volume percent of the total pore volume of the support. In a preferred preparative route the volume of the solution of the ionic compound does not exceed substantially, and is preferably equal to, the total pore volume of the support.

Such methods of preparation may be referred to as incipient precipitation or incipient wetness techniques.

More recently WO 02/06357 describes an improved incipient wetness technique for the preparation of a supported metallocene catalyst system in which the support is impregnated with an ionic compound and the metallocene complex followed by treatment with an organometallic compound.

The preferred metal with respect to the organometallic compound is aluminum and the preferred metal for the ionic activator is boron whereby the molar ratio of Al/B is in the range of 0.1 to 2.0, and is preferably in the range of 0.1 to 0.8, and most preferably in the range of 0.3 to 0.6.

The "ionic activators" described above are highly desirable for slurry and gas phase olefin polymerizations especially for the preparation of catalysts which are not as prone to cause reactor fouling as similar catalysts prepared with aluminoxanes. One challenge that remains is to increase the activity/productivity of catalysts that incorporate these activators. We have discovered that certain catalyst molecules having cyclopentadienyl and phosphinimine ligands exhibit excellent activity when the cyclopentadienyl ligand is substituted. The level of substitution should include at least 2 carbon atoms. A preferred maximum level of substitution is 25 carbon atoms (on the 5 carbon atom ring of the cyclopentadienyl ligand) due to steric considerations.

SUMMARY OF THE INVENTION

The present invention provides a supported catalyst comprising of:

(a)(1) a support material;

(a)(2) an organometal or metalloid compound wherein the metal or metalloid is selected from the group consisting of magnesium, zinc, boron, aluminum, germanium, tin, lead, and mixtures thereof; and (b) an activator compound comprising:

(b)(1) a cation which is capable of reacting with a transition metal metallocene compound to form a transition metal complex which is catalytically active for the polymerization of alpha-olefins;

(b)(2) a compatible anion having up to 100 nonhydrogen atoms and containing at least one substituent comprising a moiety having an active hydrogen; and (c) phosphinimine/substituted cyclopentadienyl organometallic complex according to the formula:

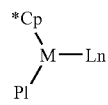

wherein M is a group 4 metal; *Cp is a eta-5 bonded cyclopentadienyl ligand; PI is a phosphinimine ligand having at least one hydrocarbyl substituent containing from one to 20 carbon atoms; L is a leaving group ligand; and n is 1 or 2, depending upon the valence of m.

The use of the substituted cyclopentadienyl ligand with the defined supported activator provides an exceptional catalyst.

A preferred supported catalyst according to the present invention is one comprising:

(c) phosphinimine/substituted cyclopentadienyl organometallic complex according to the formula:

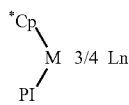

wherein M is a group 4 metal; *Cp is a eta-5 bonded cyclopentadienyl ligand which contains from 7 to 30 carbon atoms; PI is a phosphinimine ligand; L is a leaving group ligand; and n is 1 or 2, depending upon the valence of m, with the further provisos that:

a) said catalyst contains from 1 to 2,000 mu.mol of activator compound per gram of support material; and b) *Cp is selected from the group consisting of 2-pentafluorophenyl cyclopentadienyl, tri-butyl-2- pentafluorophenyl cyclopentadienyl and 2-pentafluorophenyl indenyl.

DETAILED DESCRIPTION

Detailed descriptions of essential catalyst components (namely (i) the support; (ii) the catalyst molecule; and (iii) the organometal/metalloid.

Particulate Metal Oxide Support

The catalyst of this invention must be prepared with a particulate metal oxide support.

The use of metal oxide supports in the preparation of olefin polymerization catalysts is known to those skilled in the art. An exemplary list of suitable metal oxides includes oxides of aluminum, silicon, zirconium, zinc and titanium. Alumina, silica and silica-alumina are metal oxides which are well known for use in olefin polymerization catalysts and are preferred for reasons of cost and convenience. Silica is particularly preferred.

It is preferred that the metal oxide have a particle size of from about 1 to about 200 microns. It is especially preferred that the particle size be between about 30 and 100 microns if the catalyst is to be used in a gas phase or slurry polymerization process and that a smaller particle size (less than 10 microns) be used if the catalyst is used in a solution polymerization.

Conventional porous metal oxides, which have comparatively high surface areas (greater than 1 m²/g, particularly greater than 100 m²/g, more particularly greater than 200 m²/g), are preferred to non-porous metal oxides.

The support material may be subjected to a heat treatment and/or chemical treatment to reduce the water content or the hydroxyl content of the support material.

Typically chemical dehydration agents are reactive metal hydrides, aluminum alkyls and halides. Prior to its use the support material may be subjected to treatment at 100° C. to 1000° C. and preferably at 200 to 850° C. in an inert atmosphere under reduced pressure.

The support material may be further combined with an organoaluminum compound and most preferably a trialkylaluminum compound in a dilute solvent.

The support material is preferably pretreated with the trialkylaluminum compound at a temperature of 20° C. to 150° C. and preferably at 20° C. to 100° C.

The molar ration of transition metal in the catalyst compound (which transition metal is preferably titanium or zirconium) to ionic activator employed in the method of the present invention may be in the range 1:10000 to 100:1. A preferred range is from 1:5000 to 10:1 and most preferred from 1:10 to 10:1.

2. Catalyst Molecule

The catalyst molecule of the present invention is a phosphinimine complex of a group 4 transition metal having at least one phosphinimine ligand (as defined below), at least one leaving group (as defined below) and at least one substituted cyclopentadienyl ligand.

These catalyst molecules are represented by the formula:

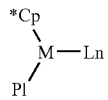

wherein PI is a phosphinimine ligand; M is a group 4 transition metal; L is an activatable ligand; n is one or two, depending upon the valences of M and L; and *Cp is a substituted cyclopentadienyl ligand which is eta-5 bonded with the group 4 transition metal and which contains from 7 to 30 carbon atoms.

2.1 *Cp Ligand

The *Cp ligand is a substituted cyclopentadienyl ligand which contains a total of from 7 to 30 carbon atoms.

The use of substituents on such cyclic ligands is well known and is described, for example, in U.S. Pat. No. 5,324, 800 (Welborn). An exemplary list of substituents for such Cp ligands includes $C_{1-20}$ hydrocarbyl groups; substituted $C_{1-20}$ hydrocarbyl groups wherein one or more hydrogen atoms is replaced by a halogen; an amido group, a phosphido group, or an alkoxy group. The substituent may form a bridge with the phosphinimine ligand. The substituents may be bonded to each other (as in, for example, an indenyl ligand). As shown in the examples, fluoro-substituted Cp ligands are preferred.

A cyclopentadienyl ligand contains 5 carbon atoms in the ring structure. The substituted cyclopentadienyl ligand used in this invention must contain at least 7 carbon atoms, i.e. in addition to the 5 carbon atoms of the cyclopentadienyl ligand, at least 2 extra carbon atoms are required.

2.2 Phosphinimine Ligand

The catalyst component of this invention must contain a phosphinimine ligand, which is covalently bonded to the metal. This ligand is defined by the formula:

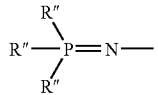

wherein each R" is independently selected from the group consisting of a hydrogen atom, a halogen atom, $C_{1-20}$ hydrocarbyl radicals which are unsubstituted by or further substituted by a halogen atom, a $C_{1-8}$ alkoxy radical, a $C_{6-10}$ aryl or aryloxy radical, an amido radical, a silyl radical of the formula:

wherein each $R^2$ is independently selected from the group consisting of hydrogen, $C_{1-8}$ alkyl or alkoxy radical, $C_{6-10}$ aryl or aryloxy radicals, and a germanyl radical of the formula:

wherein $R^2$ is as defined above.

The preferred phosphinimines are those in which each R" is a hydrocarbyl radical. A particularly preferred phosphinimine is tri-(tertiary butyl) phosphinimine (i.e. where each R" is a tertiary butyl group).

2.3 Activatable Ligand

The term "activatable ligand" refers to a ligand which may be activated by a cocatalyst (also known as an "activator" to facilitate olefin polymerization. Exemplary activatable ligands are independently selected from the group consisting of a hydrogen atom, a halogen atom, a $C_{1-10}$ hydrocarbyl radical, a $C_{1-20}$ alkoxy radical, a $C_{5-10}$ aryl oxide radical; each of which said hydrocarbyl, alkoxy, and aryl oxide radicals may be unsubstituted by or further substituted by a halogen atom, a $C_{1-8}$ alkyl radical, a $C_{1-8}$ alkoxy radical, a $C_{6-10}$ aryl or aryl oxy radical, an amido radical which is unsubstituted or substituted by up to two $C_{1-8}$ alkyl radicals; a phosphido radical which is unsubstituted or substituted by up to two $C_{1-8}$ alkyl radicals.

3. Organometal/Metalloid and Ionic Activator

The support material is treated with the organometal compound. Suitable organometal compounds are those comprising metals of Groups 2-13, germanium, tin, and lead, and at least two substituents selected from hydride, hydrocarbyl radicals, trihydrocarbyl silyl radicals, and trihydrocarbyl germyl radicals. Additional substituents preferably comprise one or more substituents selected from hydride, hydrocarbyl radicals, trihydrocarbyl substituted silyl radicals, trihydrocarbyl substituted germyl radicals, and hydrocarbyl-, trihydrocarbyl silyl- or trihydrocarbyl germyl-substituted metalloid radicals.

The recitation "metalloid", as used herein, includes nonmetals such as boron, phosphorus and the like which exhibit semi-metallic characteristics.

Examples of such organometal compounds include organomagnesium, organozinc, organoboron, organoaluminum, organogermanium, organotin, and organolead compounds, and mixtures thereof. Further suitable organometal compounds are alumoxanes. Preferred examples are alumoxanes and compounds represented by the following formulae: $MgR^1{}_2$, $ZnR^1{}_2$, $BR^1{}_xR^2{}_y$, $AlR^1{}_xR^2{}_y$, wherein $R^1$ independently each occurrence is hydride, a hydrocarbyl radical, a trihydrocarbyl silyl radical, a trihydrocarbyl germyl radical, or a trihydrocarbyl-, trihydrocarbyl silyl-, or trihydrocarbyl germyl-substituted metalloid radical, $R^2$ independently is the same as $R^1$, x is 2 or 3, y is 0 or 1 and the sum of x and y is 3, and mixtures thereof. Examples of suitable hydrocarbyl moieties are those having from 1 to 20 carbon atoms in the hydrocarbyl portion thereof, such as alkyl, aryl, alkaryl, or aralkyl. Preferred radicals include methyl, ethyl, n- or i-propyl, n-, s- or t-butyl, phenyl, and benzyl. Preferably, the aluminum component is selected from the group consisting of alumoxane and aluminum compounds of the formula $AlR^1{}_x$ wherein $R^1$ in each occurrence independently is hydride or a hydrocarbyl radical having from 1 to 20 carbon atoms, and x is 3. Suitable trihydrocarbyl aluminum compounds are trialkyl or triaryl aluminum compounds wherein each alkyl or aryl group has from 1 to 10 carbon atoms, or mixtures thereof, and preferably trialkyl aluminum compounds such as trimethyl, triethyl, tri-isobutyl aluminum.

Alumoxanes (also referred to as aluminoxanes) are oligomeric or polymeric aluminum oxy compounds containing chains of alternating aluminum and oxygen atoms, whereby the aluminum carries a substituent, preferably an alkyl group. The structure of alumoxane is believed to be represented by the following general formulae $(—Al(R)—O)_m$, for a cyclic alumoxane, and $R_2Al—O(—Al(R)—O)_m—AlR_2$, for a linear compound, wherein R independently in each occurrence is a $C_1$-$C_{10}$ hydrocarbyl, preferably alkyl, or halide and m is an integer ranging from 1 to about 50, preferably at least about 4. Alumoxanes are typically the reaction products of water and an aluminum alkyl, which in addition to an alkyl group may contain halide or alkoxide groups. Reacting several different aluminum alkyl compounds, such as, for example, trimethyl aluminum and tri-isobutyl aluminum, with water yields so-called modified or mixed alumoxanes. Preferred alumoxanes are methylalumoxane and methylalumoxane modified with minor amounts of other lower alkyl groups such as isobutyl. Alumoxanes generally contain minor to substantial amounts of starting aluminum alkyl compound.

The way in which the alumoxane is prepared is not critical. When prepared by the reaction between water and aluminum alkyl, the water may be combined with the aluminum alkyl in various forms, such as liquid, vapor, or solid, for example in the form of crystallization water. Particular techniques for the preparation of alumoxane type compounds by contacting an aluminum alkyl compound with an inorganic salt containing water of crystallization are disclosed in U.S. Pat. No. 4,542,199. In a particular preferred embodiment an aluminum alkyl compound is contacted with a regeneratable water-containing substance such as hydrated alumina, silica or other substance. This is disclosed in European Patent Application No. 338,044.

The supported catalyst component and supported catalyst of the present invention generally comprise a support material combined or treated with the organometal compound, preferably an aluminum component, and containing at least 0.1 micromol of organometal compound per g of support material, typically at least 5 micromole per g support material, advantageously at least 0.5 weight percent of the metal, preferably aluminum, expressed in gram of metal, preferably aluminum, atoms per g of support material. Preferably, the amount of metal, advantageously aluminum, is at least 2 weight percent, and generally not more than 40 weight percent, and more preferably not more than 30 weight percent. At too high amounts of metal, preferably aluminum, the supported catalyst becomes expensive. At too low amounts the catalyst efficiency goes down to drop below acceptable levels.

The supported catalyst component and supported catalyst of the present invention preferably contain a treated support material (a) comprising a support material and an alumoxane wherein not more than about 10 percent aluminum present in the treated support material is extractable in a one hour extraction with toluene of 90° C. using about 10 mL toluene per gram of pretreated support material. More preferably, not more than about 9 percent aluminum present in the supported catalyst component is extractable, and most preferably not more than about 8 percent. This is especially advantageous when the supported catalyst component or catalyst prepared therefrom is used in a polymerization process where a diluent or solvent is used which may extract non-fixed alumoxane from the support material. It has been found that when the amount of extractables is below the levels given above, the amount of alumoxane that can diffuse into the polymerization solvent or diluent, if used, is so low that no appreciable amount of polymer will be formed in the diluent, as compared to polymer formed on the support material. If too much polymer is formed in the diluent the polymer bulk density will decrease below acceptable levels and reactor fouling problems may occur.

The toluene extraction test is carried out as follows: About 1 g of supported catalyst component or supported catalyst, with a known aluminum content, is added to 10 mL toluene and the mixture is then heated to 90° C. under an inert atmosphere. The suspension is stirred well at this temperature for 1 hour. Then the suspension is filtered applying reduced pressure to assist in the filtration step. The solids are washed twice with about 3 to 5 mL toluene of 90° C. per gram of solids. The solids are then dried at 120° C. for 1 hour, and subsequently the aluminum content of the solids is measured. The difference between the initial aluminum content and the aluminum content after the extraction divided by the initial aluminum content and multiplied by 100%, gives the amount of extractable aluminum.

The aluminum content can be determined by slurrying about 0.5 g of supported catalyst component or supported catalyst in 10 mL hexane.

More specifically, preferred activator compounds contain a compatible anion having up to 100, and preferably up to 50 non-hydrogen atoms and having at least one substituent comprising an active hydrogen moiety. Preferred substituents comprising an active hydrogen moiety correspond to the formula:

$$G_q(T\text{-}H)_r$$

wherein G is a polyvalent hydrocarbon radical, T is O, S, NR, or PR, wherein R is a hydrocarbyl radical, a trihydrocarbyl silyl radical, a trihydrocarbyl germyl radical, or hydrogen, H is hydrogen, q is 0 or 1, and preferably 1, and r is an integer from 1 to 3, preferably 1. Polyvalent hydrocarbon radical G has r+1 valencies, one valency being with a metal or metalloid of the Groups 5-15 of the Periodic Table of the Elements in the compatible anion, the other valency or valencies of G being attached to r groups T-H. Preferred examples of G include divalent hydrocarbon radicals such as: alkylene, arylene, aralkylene, or alkarylene radicals containing from 1 to 20 carbon atoms, more preferably from 2 to 12 carbon atoms. Suitable examples of G include phenylene, biphenylene, naphthylene, methylene, ethylene, 1,3-propylene, 1,4-butylene, phenylmethylene (—$C_6H_4$—$CH_2$—). The polyvalent hydrocarbyl portion G may be further substituted with radicals that do not interfere with the coupling function of the active hydrogen moiety. Preferred examples of such noninterfering substituents are alkyl, aryl, alkyl- or aryl-substituted silyl and germyl radicals, and fluoro substituents.

The group T-H in the previous formula thus may be an —OH, —SH, —NRH, or —PRH group, wherein R preferably is a $C_{1-18}$, preferably a $C_{1-10}$ hydrocarbyl radical or hydrogen, and H is hydrogen. Preferred R groups are alkyls, cycloalkyls, aryls, arylalkyls, or alkylaryls of 1 to 18 carbon atoms, more preferably those of 1 to 12 carbon atoms. The —OH, —SH, —NRH, or —PRH groups may be part of a larger functionality such as, for example, C(O)—OH, C(S)—SH, C(O)—NRH, and C(O)—PRH. Most preferably, the group T-H is a hydroxy group, —OH, or an amino group, —NRH.

Very preferred substituents $G_q(T\text{-}H)_r$ comprising an active hydrogen moiety include hydroxy- and amino-substituted aryl, aralkyl, alkaryl or alkyl groups, and most preferred are the hydroxyphenyls, especially the 3- and 4-hydroxyphenyl groups, hydroxytolyls, hydroxy benzyls (hydroxymethylphenyl), hydroxybiphenyls, hydroxynaphthyls, hydroxycyclohexyls, hydroxymethyls, and hydroxypropyls, and the corresponding amino-substituted groups, especially those substituted with —NRH wherein R is an alkyl or aryl radical having from 1 to 10 carbon atoms, such as for example methyl, ethyl, propyl, i-propyl, n-, i-, or t-butyl, pentyl, hexyl, heptyl, octyl, nonyl, and decyl, phenyl, benzyl, tolyl, xylyl, naphthyl, and biphenyl.

The compatible anion containing the substituent which contains an active hydrogen moiety, may further comprise a single Group 5-15 element or a plurality of Group 5-15 elements, but is preferably a single coordination complex comprising a charge-bearing metal or metalloid core, which anion is bulky. A compatible anion specifically refers to an anion which when functioning as a charge balancing anion in the catalyst system of this invention, does not transfer an anionic substituent or fragment thereof to the transition metal cation thereby forming a neutral transition metal compound and a neutral metal by-product. "Compatible anions" are anions which are not degraded to neutrality when the initially formed complex decomposes and are non-interfering with desired subsequent polymerizations. Preferred anions are those containing a single coordination complex comprising a charge-bearing metal or metalloid core carrying a substituent containing an active hydrogen moiety which anion is relatively large (bulky), capable of stabilizing the active catalyst species (the transition metal cation) which is formed when the activator compound and transition metal compound are combined and said anion will be sufficiently labile to be displaced by olefinic, diolefinic and acetylenically unsaturated compounds or other neutral Lewis bases such as ethers, nitrites and the like. Suitable metals for the anions of activator compounds include, but are not limited to, aluminum, gold, platinum and the like. Suitable metalloids include, but are not limited to, boron, phosphorus, silicon and the like. Activator compounds which contain anions comprising a coordination complex containing a single boron atom and a substituent comprising an active hydrogen moiety are preferred.

Preferably, compatible anions containing a substituent comprising an active hydrogen moiety may be represented by the following general Formula (I):

$$[M'^{m+}Q_n(G_q(T\text{-}H)_r)_z]^{d-} \quad (I)$$

wherein M' is a metal or metalloid selected from Groups 5-15 of the Periodic Table of the Elements; Q independently in each occurrence is selected from the group consisting of hydride, dihydrocarbylamido, preferably dialkylamido, halide, hydrocarbyloxide, preferably alkoxide and aryloxide, hydrocarbyl, and substituted-hydrocarbyl radicals, including halo-substituted hydrocarbyl radicals, and hydrocarbyl- and halohydrocarbyl-substituted organo-metalloid radicals, the hydrocarbyl portion having from 1 to 20 carbons with the proviso that in not more than one occurrence is Q halide; G is a polyvalent, having r+1 valencies and preferably divalent hydrocarbon radical bonded to M' and T; T is O, S, NR, or PR, wherein R is a hydrocarbon radicals a trihydrocarbyl silyl radical, a trihydrocarbyl germyl radical, or hydrogen; m is an integer from 1 to 7, preferably 3; n is an integer from 0 to 7, preferably 3; q is an integer 0 or 1, preferably 1; r is an integer from 1 to 3, preferably 1; z is an integer from 1 to 8, preferably 1; d is an integer from 1 to 7, preferably 1; and n+z−m=d.

Preferred boron-containing anions which are particularly useful in this invention may be represented by the following general Formula (II):

$$[BQ_{4-z'}(G_q(T-H)_r)_{z'}]^{d-} \quad \text{(II)}$$

wherein B is boron in a valence state of 3; z' is an integer from 1-4, preferably 1; d is 1; and Q, G, T, H, q, and r are as defined for Formula (I). Preferably, z' is 1, q is 1, and r is 1.

Illustrative, but not limiting, examples of anions of activator compounds to be used in the present invention are boron-containing anions such as triphenyl(hydroxyphenyl)borate, diphenyl-di(hydroxyphenyl)borate, triphenyl(2,4-dihydroxyphenyl)borate, tri(p-tolyl)(hydroxyphenyl)borate, tris-(pentafluorophenyl)(hydroxyphenyl)borate, tris-(2,4-dimethylphenyl)(hydroxyphenyl)borate, tris-(3,5-dimethylphenyl)(hydroxyphenyl)borate, tris-(3,5-di-trifluoromethylphenyl)(hydroxyphenyl)borate, tris(pentafluorophenyl)(2-hydroxyethyl)borate, tris(pentafluorophenyl)(4-hydroxybutyl)borate, tris(pentafluorophenyl)(4-hydroxycyclohexyl)borate, tris(pentafluorophenyl)(4-(4'-hydroxyphenyl)phenyl)borate, tris(pentafluorophenyl) (6hydroxy-2-naphthyl)borate, and the like. A highly preferred activator complex is tris(pentafluorophenyl)(4-hydroxyphenyl)borate. Other preferred anions of activator compounds are those above mentioned borates wherein the hydroxy functionality is replaced by an amino NHR functionality wherein R preferably is methyl, ethyl, or t-butyl.

The cationic portion b.1) of the activator compound to be used in association with the compatible anion b.2) can be any cation which is capable of reacting with the transition metal compound to form a catalytically active transition metal complex, especially a cationic transition metal complex. The cations b.1) and the anions b.2) are used in such ratios as to give a neutral activator compound. Preferably the cation is selected from the group consisting of Bronsted acidic cations, carbonium cations, silylium cations, and cationic oxidizing agents.

Bronsted acidic cations may be represented by the following general formula:

$$(L-H)^+$$

wherein L is a neutral Lewis base, preferably a nitrogen, phosphorus, or sulfur containing Lewis base; and $(L-H)^+$ is a Bronsted acid. The Bronsted acidic cations are believed to react with the transition metal compound by transfer of a proton of said cation, which proton combines with one of the ligands on the transition metal compound to release a neutral compound.

Illustrative, but not limiting, examples of Bronsted acidic cations of activator compounds to be used in the present invention are trialkyl-substituted ammonium cations such as triethylammonium, tripropylammonium, tri(n-butyl)ammonium, trimethylammonium, tributylammonium, and tri(n-octyl)ammonium. Also suitable are N,N-dialkyl anilinium cations such as N,N-dimethylanilinium, N,N-diethylanilinium, N,N-2,4,6-pentamethylanilinium, N,N-dimethylbenzylammonium and the like; dialkylammonium cations such as di-(i-propyl)ammonium, dicyclohexylammonium and the like; and triarylphosphonium cations such as triphenylphosphonium, tri(methylphenyl)phosphonium, tri(dimethylphenyl) phosphonium, dimethylsulphonium, diethylsulphonium, and diphenylsulphonium.

Particularly suitable are those cations having longer alkyl chains such as dihexydecylmethylammonium, dioctadecylmethylammonium, ditetradecylmethylammonium, bis(hydrogenated tallow alkyl) methylammonium and similar.

Particular preferred activators of this type are alkylammonium tris (pentaflurorphenyl) 4-(hydroxyphenyl) borates. A particularly preferred activator is bis(hydrogenated tallow alkyl) methyl ammonium tris (pentafluorophenyl) (4-hydroxyphenyl) borate.

A second type of suitable cations corresponds to the formula: $C^+$, wherein $C^+$ is a stable carbonium or silylium ion containing up to 30 non-hydrogen atoms, the cation being capable of reacting with a substituent of the transition metal compound and converting it into a catalytically active transition metal complex, especially a cationic transition metal complex. Suitable examples of cations include tropyllium, triphenylmethylium, benzene(diazonium). Silylium salts have been previously generically disclosed in J. Chem. Soc. Chem. Comm., 1993, 383-384, as well as Lambert, J. B., et al., Organometallics, 1994, 13, 2430-2443. Preferred silylium cations are triethylsilylium, and trimethylsilylium and ether substituted adducts thereof.

Another suitable type of cation comprises a cationic oxidizing agent represented by the formula:

$$Ox^{e+}$$

wherein $Ox^{e+}$ is a cationic oxidizing agent having a charge of e+, and e is an integer from 1 to 3.

Examples of cationic oxidizing agents include: ferrocenium, hydrocarbyl-substituted ferrocenium, $Ag^+$, and $Pb^{2+}$.

The quantity of activator compound in the supported catalyst component and the supported catalyst is not critical, but typically ranges from 0.1, preferably from 1 to 2,000 micromoles of activator compound per gram of treated support material. Preferably, the supported catalyst or component contains from 10 to 1,000 micromoles of activator compound per gram of treated support material.

The supported catalyst component of the present invention as such or slurried in a diluent can be stored or shipped under inert conditions, or can be used to generate the supported catalyst of the present invention.

With respect to this type of activator, a particularly preferred compound is the reaction product of an alkylammonium tris (pentafluorophenyl)-4-(hydroxyphenyl) borate and an organometallic compound, for example trimethylaluminum.

Thus according to another aspect of the present invention there is provided a process for the polymerization of olefin monomers selected from (a) ethylene, (b) propylene, (c) mixtures of ethylene and propylene, and (d) mixtures of (a), (b), or (c) with one or more other alpha olefins, said process performed in the presence of a supported transition metal catalyst system as hereinbefore described.

The supported transition metal catalysts of the present invention may be used for the polymerization of olefins in solution, slurry or the gas phase.

A slurry process typically uses an inert hydrocarbon diluent and temperatures from about 0° C. up to a temperature just below the temperature at which the resulting polymer becomes substantially soluble in the inert polymerization medium. Suitable diluents include toluene or alkanes such as hexane, propane or isobutane. Preferred temperatures are from about 30° C. up to about 200° C. but preferably from about 60° C. to 100° C. Loop reactors are widely used in slurry polymerization processes.

The preferred process for the present invention is the gas phase.

Suitable gas phase processes of the present invention include the polymerization of alpha olefins, especially for the homopolymerization and the copolymerization of ethylene with alpha olefins for example 1-butene, 1-hexene, 4-methyl-1-pentene are well known in the art. Particularly preferred gas phase processes are those operating in a fluidized bed.

Examples of such processes are described in EP 89691 and EP 699213, the latter being a particularly preferred process for use with the supported catalysts of the present invention.

Particularly preferred polymerization processes are those comprising the polymerization of ethylene or the copolymerization of ethylene and a-olefins having from 3 to 10 carbon atoms.

Thus, according to another aspect of the present invention there is provided a process for the polymerization of ethylene or the copolymerization of ethylene and a-olefins having from 3 to 10 carbon atoms, said process performed under polymerization conditions in the present of a supported transition metal catalyst system prepared as hereinbefore described.

EXAMPLES

Part A—Catalyst Synthesis

Catalyst A—Comparative

A commercially available silica (Sylopol 2408, from W.R. Grace-Davison) was dehydrated in a manner that reduced the total residual volatiles in the silica to 0.6% by weight. A supported catalyst, using this dehydrated silica as the support, was prepared in the following manner.

29.00 kg of dehydrated Sylopol 2408 silica was slurried in a minimal amount of toluene under inert atmospheric conditions. 33.67 kg of a 30 weight percent solution of a commercially available methylaluminoxane (MAO purchased from Albemarle) in toluene was metered into the mixture. Upon completion of the MAO addition, the slurry was stirred for an additional 30 minutes. At this point, the slurry was sampled to determine the Al content in the MAO-silica solids and the supernatant liquid. Al content was determined to be 10.9 weight percent in the MAO-silica solid and 539 ppm by weight in the supernatant liquid indicating essentially complete supporting of MAO at this stage. 730.1 g of (pentafluorophenylcyclopentadienyl)(tri-tertiarybutylphosphinimido) titanium dichloride was dissolved in a minimal amount of toluene and added to the MAO-silica slurry. The mixture was then stirred for 1 hour. At this point the slurry concentration was such that the concentration was 25 weight percent solids based on theoretical calculation of the final mass of supported catalyst expected. The slurry was decanted and washed a total of three times with hexane to remove toluene prior to drying. Analysis of the recovered catalyst indicated 11.1 weight percent aluminum, 0.175 weight percent titanium (Al:Ti=112.6 mole:mole) and 1.3 weight percent residual volatiles.

Catalyst B—Inventive

Grace-Davison Sylopol 2408 silica was dehydrated in a manner that reduced the total residual volatiles in the silica to 0.9% by weight. The remaining surface hydroxyl groups in the silica were chemically passified in the following manner. 130 g of the dehydrated Sylopol 2408 silica was slurried in 300 mL of dry, degassed heptane under an inert atmosphere. 156 mL of a 25 weight percent solution of triethyl aluminum (TEAL) in toluene was then added to the silica slurry. An additional 150 mL of heptane was then added. The mixture was swirled by hand and then placed on a rotational agitator, at slow speed, for 3 hours. The solids were then recovered by filtration and washed three times with 200 mL of heptane. The washed solids were then vacuum dried to a residual pressure of 300 millitorr.

118.5 g of the TEAL-passified silica was placed in a 1 L, pear-shaped flask. In a separate 125 mL hypo-vial, 52.8 mL of a 9.7 weight percent toluene solution of $[(C_{18}H_{37})_2CH_3NH]\{(C_6F_5)_3B(C_6H_4OH)\}$, known as B-2, and 15.8 mL of 0.25 molar TEAL in toluene were mixed and allowed to sit for 5 minutes. This solution was then added to the TEAL-passified silica in the 1 L flask and mixed slowly on the rotational agitator for 1 hour. 24.5 mL of a 10 weight percent solution of (pentafluorophenylcyclopentadienyl)(tri-tertiarybutylphosphinimido)titanium dichloride in toluene was then added to the 1 L flask which was then mixed on the rotational agitator for an additional 1 hour. This corresponds to a boron:titanium mole ratio of about 1.05:1. 400 mL of heptane was added to the flask, which was then further mixed on the rotational agitator for 1 hour. Solid catalyst was recovered by filtration and washed three times with 250 mL of heptane. The washed catalyst was then dried under vacuum to a residual pressure of 300 millitorr. Metal contents in the supported catalyst were measured to be 0.148 weight percent titanium and 2.6 weight percent aluminum.

Catalyst C—Comparative

Grace-Davison Sylopol 2408 silica was dehydrated in a manner that reduced the total residual volatiles in the silica to 0.9% by weight. A supported catalyst, using this dehydrated silica as the support, was prepared in the following manner.

144.7 g of dehydrated Sylopol 2408 silica was slurried in a minimal amount of toluene under inert atmospheric conditions. 185 mL of a 30 weight percent solution of Albemarle methylaluminoxane (MAO) in toluene was added into the mixture. Upon completion of the MAO addition, the slurry was stirred for an additional 30 minutes 4.22 g of (1-ethyl-2-pentafluorophenyl-cyclopentadienyl)(tri-tertiarybutylphosphinimido)titanium dichloride was dissolved in a minimal amount of toluene and added to the MAO-silica slurry. The mixture was then stirred for 1 hour. The slurry was decanted and washed a total of three times with hexane to remove toluene prior to drying under vacuum to a residual pressure of 300 millitorr. The finished catalyst contained 0.173 percent titanium by weight.

Catalyst D

Grace-Davison Sylopol 2408 silica was dehydrated in a manner that reduced the total residual volatiles in the silica to 0.9% by weight. The remaining surface hydroxyl groups in the silica were chemically passified in the following manner.

130 g of the dehydrated Sylopol 2408 silica was slurried in 300 mL of dry, degassed heptane under an inert atmosphere. 156 mL of a 25 weight percent solution of triethyl aluminum (TEAL) in toluene was then added to the silica slurry. An additional 150 mL of heptane was then added. The mixture was swirled by hand and then placed on a rotational agitator, at slow speed, for 3 hours. The solids were then recovered by filtration and washed three times with 200 mL of heptane. The washed solids were then vacuum dried to a residual pressure of 300 millitorr.

94.7 g of the TEAL-passified silica was placed in a 1 L, pear-shaped flask. In a separate 125 mL hypo-vial, 42.3 mL of a 9.7 weight percent toluene solution of $[(C_{18}H_{37})_2CH_3NH]\{(C_6F_5)_3B(C_6H_4OH)\}$, known as B-2, and 12.6 mL of 0.25 molar TEAL in toluene were mixed and allowed to sit for 5 minutes. This solution was then added to the TEAL-passified silica in the 1 L flask and mixed slowly on the rotational agitator for 1 hour. 20.6 mL of a 10 weight percent solution of (1-ethyl-2-pentafluorophenyl-cyclopentadienyl)(tri-tertiary-butylphosphinimido)titanium dichloride in toluene was then added to the 1 L flask which was then mixed on the rotational agitator for an additional 1 hour. 400 mL of heptane was added to the flask, which was then further mixed on the rotational agitator for 1 hour. Solid catalyst was recovered by filtration and washed three times with 250 mL of heptane. The washed catalyst was then dried under vacuum to a residual pressure of 300 millitorr. The finished catalyst contained 0.148 percent titanium by weight.

Catalyst E

Grace-Davison Sylopol 2408 silica was dehydrated in a manner that reduced the total residual volatiles in the silica to 0.9% by weight. The remaining surface hydroxyl groups in the silica were chemically passified in the following manner. 130 g of the dehydrated Sylopol 2408 silica was slurried in 300 mL of dry, degassed heptane under an inert atmosphere. 156 mL of a 25 weight percent solution of triethyl aluminum (TEAL) in toluene was then added to the silica slurry. An additional 150 mL of heptane was then added. The mixture was swirled by hand and then placed on a rotational agitator, at slow speed, for 3 hours. The solids were then recovered by filtration and washed three times with 200 mL of heptane. The washed solids were then vacuum dried to a residual pressure of 300 millitorr.

118.8 g of the TEAL-passified silica was placed in a 1 L, pear-shaped flask. In a separate 125 mL hypo-vial, 52.8 mL of a 9.7 weight percent toluene solution of $[(C_{18}H_{37})_2CH_3NH]\{(C_6F_5)_3B(C_6H_4OH)\}$, known as B-2, and 15.8 mL of 0.25 molar TEAL in toluene were mixed and allowed to sit for 5 minutes. This solution was then added to the TEAL-passified silica in the 1 L flask and mixed slowly on the rotational agitator for 1 hour. 27.0 mL of a 10 weight percent solution of (1-n-butyl-2-pentafluorophenyl-cyclopentadienyl)(tri-tertiarybutylphosphinimido)titanium dichloride in toluene was then added to the 1 L flask which was then mixed on the rotational agitator for an additional 1 hour. 400 mL of heptane was added to the flask, which was then further mixed on the rotational agitator for 1 hour. Solid catalyst was recovered by filtration and washed three times with 250 mL of heptane. The washed catalyst was then dried under vacuum to a residual pressure of 300 millitorr. The finished catalyst contained 0.133 percent titanium and 2.5 percent aluminum by weight.

Catalysts F, G, and H

Grace-Davison Sylopol 948 silica was dehydrated at 250° C. under a nitrogen atmosphere for 5 hours, prior to use in the preparation of the TEAL-passified silica described in the following section.

a) TEAL-Passified Silica (SiO$_2$/TEAL)

Add 650 mL of dry, degassed heptane to a 1 L, pear-shaped flask, followed by 11.25 of a 0.29 wt % solution of Stadis® 425 (Octel Starrion L.L.C.) in heptane and 150 g of calcined Sylopol 948 silica. The flask was placed on the rotating arm of a rotary evaporator and turned slowly for 15 minutes. 100 mL of a 25 wt % TEAL in hexane solution was added to the flask and then swirled by hand (Note: there is some heat evolution). 75 mL of 25 wt % TEAL in hexane was then added. The flask was then placed on the rotating arm of a rotary evaporator and turned slowly for 1 hour. The slurry was filtered. The filter cake was transferred back to the flask, reslurried in 350 mL of heptane and rotated for an additional 30 minutes. The slurry was filtered. The filter cake was transferred back to the flask, reslurried in 350 mL of heptane and rotated for an additional 30 minutes. The slurry was filtered a third time. The filter cake was transferred back to the flask, reslurried in 350 mL of heptane along with 11.25 mL of the 0.29 wt % solution of Stados® 425 in heptane. The flask was placed on the rotating arm of a rotary evaporator and turned slowly for 15 minutes. The solvent was then removed under vacuum while heating to 60° C. to reach a final vacuum of 300 millitorr.

b) Supported Catalyst Preparation

Supported catalysts F, G and H were prepared according the following recipe and differ only in the choice and amount of catalyst precursor molecule.

Working in a glovebox under inert atmospheric conditions, 1.43 mL of a 9.58 weight percent toluene solution of $[(C_{18}H_{37})_2CH_3NH]\{(C_6F_5)_3B(C_6H_4OH)\}$ and 0.42 mL of 0.25 molar TEAL in toluene were mixed in a 100 mL round-bottomed flask and allowed to sit for 5 minutes. 1.61 g of SiO$_2$/TEAL was then added and the mixture was shaken on a Lab-Line Mistral Multi-Mixer at high speed for 1 hour. The appropriate amount of a solution of the catalyst precursor molecule in heptane was premixed with 0.3 mL of dry, degassed hexene in a hypo-vial and swirled on the Multi-Mixer gently for 15 minutes. For Catalyst F, 0.85 mL of 10 wt % (dimethyl)(1-n-butyl-2-pentafluorophenyl-cyclopentadienyl)(tri-tertiarybutylphosphinimido)titanium in heptane was premixed with the 0.3 mL of hexene. For Catalyst G, 1.05 mL of 8 wt % (dimethyl)(2-pentafluorophenyl-indenyl)(tri-tertiarybutylphosphinimido)titanium in heptane was premixed with the 0.3 mL of heptane. For Catalyst H, 0.53 mL of 10 wt % (dimethyl)(cyclopentadienyl)(tri-tertiarybutylphosphinimido)titanium in heptane was premixed with the 0.3 mL of hexene. The molecule plus hexene solution was then added to the flask containing the support plus activator material. The flask was then shaken for 1 hour. 0.20 mL of a 2 g/L solution of Stadis® 425 (available from Octel Starrion L.L.C.) in heptane was then added to the mixture followed by an additional 15 minutes of mixing. The flask was then placed under vacuum and dried to a residual pressure of 300 millitorr. Finished catalyst F contained 0.202 percent titanium by weight. Finished catalyst G contained 0.212 percent titanium by weight. Finished catalyst H contained 0.320 percent titanium by weight.

Part B—Ethylene Homopolymerization

Ethylene homopolymerization experiments were conducted on a 2 L, stirred, autoclave reactor in gas phase operation. The polymerizations were run at 85° C. for 60 minutes under an ethylene pressure of 200 psig. During reactor conditioning and setup, 0.4 mL of a 25 weight percent solution of tri-isobutylaluminum (TiBAL) was used as an impurity scavenger to assist with purification of reactor internals and the seedbed (which was 130 grams of granular high density polyethylene "HDPE"). Prior to initiation of polymerization, 25-30 mg of catalyst was loaded into an injection tube under anaerobic conditions in a glovebox and was then connected to the reactor. A portion of the ethylene gas used to create the 200 psig pressure was used to push the catalyst into the reactor to initiate polymerization. Throughout the polymerization, ethylene was allowed to flow to the reactor through a mass flow meter to maintain a constant pressure of 200 psig. Measurement of this ethylene flow rate over time provided a measure of polymerization rate as a function of time.

Ethylene homopolymerization details are provided in Table 1.

TABLE 1

| Example | Catalyst | Amount of Catalyst (mg) | Yield of PE (g) | Activity[1] | Productivity[2] | Cocatalyst |
|---------|----------|------------------------|-----------------|-------------|-----------------|------------|
| 1 | A[c] | 28 | 12.6 | 22584 | 426.7 | MAO |
| 2 | B | 29 | 37.5 | 79417 | 1292.1 | B-2 |
| 3 | C[c] | 27 | 24.5 | 47692 | 906.4 | MAO |
| 4 | D | 27 | 27.5 | 62519 | 1017.2 | B-2 |
| 5 | E | 26 | 44.9 | 117835 | 1713.9 | B-2 |

[1]Activity is given in units of gPE/mmol Ti • [$C_2^=$] • hr; where [$C_2^=$] is the molar concentration of ethylene in the bulk gas phase of the reactor.
[2]Productivity is given in units of gPE/gCatalyst.
[c]Comparative Part C—Copolymerization Ethylene-hexene copolymerization experiments were conducted on a 2 L, stirred, autoclave reactor in gas phase operation. Copolymerizations were run at 85° C. for 60 minutes with a total operating pressure of 200 psig. Gas phase compositions for ethylene and hexene were controlled via closed-loop process control to values of 40.0 and 0.20 mole percent, respectively. Hydrogen was metered into the reactor in a molar feed ratio of 0.0014 relative to ethylene feed during polymerization. Nitrogen constituted the remainder of the gas phase mixture (approximately 59.2 mole %). During reactor conditioning and setup, 0.4 mL of a 25 weight percent solution of tri-isobutylaluminum (TiBAL) was used as an impurity scavenger to assist with purification of reactor internals and the 130 g HDPE seedbed. Catalysts (see Table 2) were loaded into an injection tube under anaerobic conditions in a glovebox and was then connected to the reactor. A portion of the nitrogen used to make up the reactor gas composition was used to push the catalyst into the reactor at the start of polymerization. The reactor was vented at a controlled rate throughout the polymerization, which in combination with gas consumption due to polymerization allowed for maintenance of controlled gas phase composition through the copolymerization reaction.

The details of the ethylene-hexene copolymerizations performed in the presence of added hydrogen are given in Table 2.

TABLE 2

| Example | Catalyst | Wt % Hexene | Branches/ 1000 C Atoms | Weight Average Molecular Weight | Polydispersity (Mw/Mn) | Activator |
|---------|----------|-------------|------------------------|----------------------------------|------------------------|-----------|
| 6[c] | A | 3.6 | 6.2 | 490500 | 2.07 | MAO |
| 7 | B | 4.7 | 8.2 | 386200 | 2.6 | B-2 |
| 8[c] | C | 2.8 | 4.8 | 146900 | 2.6 | MAO |
| 9 | D | 2.9 | 4.8 | 169600 | 2.83 | B-2 |
| 10 | E | 2.4 | 4 | 82700 | 2.05 | B-2 |

[c]Comparative

Physical characterization data for the polymers produced in Examples 6 to 10 are also presented in Table 2. The data in Table 2 indicate that the inventive catalysts provide good comonomer incorporation in ethylene-hexene copolymerizations.

A second set of ethylene-hexene copolymerization experiments were run under the following conditions.

Copolymerizations were run at 70° C. for 60 minutes with a total operating pressure of 300 psig. Gas phase compositions for ethylene and hexene were controlled via closed-loop process control to values of 50.0 and 0.14 mole percent, respectively. Hydrogen was metered into the reactor in a molar feed ratio of 0.00168 relative to ethylene feed during polymerization. Nitrogen constituted the remainder of the gas phase mixture (approximately 49.2 mole %). During reactor conditioning and setup, 0.4 mL of a 25 weight percent solution of tri-isobutylaluminum (TiBAL) was used as an impurity scavenger to assist with purification of reactor internals and the 100 g HDPE seedbed. Catalysts (see Table 3) were loaded into an injection tube under anaerobic conditions in a glovebox and was then connected to the reactor. A portion of the nitrogen used to make up the reactor gas composition was used to push the catalyst into the reactor at the start of polymerization. The reactor was vented at a controlled rate throughout the polymerization, which in combination with gas consumption due to polymerization allowed for maintenance of controlled gas phase composition through the copolymerization reaction.

The details of the ethylene-hexene copolymerizations performed in the presence of added hydrogen are given in Table 3.

TABLE 3

| Example | Catalyst | Productivity (gPE/gCatalyst) | Average Productivity | Standard Deviation |
|---------|----------|------------------------------|----------------------|---------------------|
| 11 | F | 888.3 | 1051.4 | 162.4 |
| 12 | F | 1168.0 | | |
| 13 | F | 1299.0 | | |
| 14 | F | 973.1 | | |
| 15 | F | 1166.9 | | |
| 16 | F | 999.0 | | |
| 17 | F | 865.7 | | |
| 18 | G | 804.6 | 915.7 | 124.8 |
| 19 | G | 1050.7 | | |
| 20 | G | 891.9 | | |
| 21 | H | 459.0 | 459.0 | n.a. |

Use of the statistical t-test comparing the productivity of Catalyst H to either Catalyst F or Catalyst G indicates that Catalyst F and Catalyst G give productivities approximately double that seen for Catalyst H with a greater than 99 percent confidence level.

What is claimed is:

1. A supported catalyst comprising:
   (a)(1) a support material;
   (a)(2) an organometal or metalloid compound wherein the metal or metalloid is selected from the group consisting of magnesium, zinc, boron, aluminum, germanium, tin, lead, and mixtures thereof; and
   (b) an activator compound comprising:
      (b)(1) a cation which is capable of reacting with a transition metal metallocene compound to form a transition metal complex which is catalytically active for the polymerization of alpha-olefins;
      (b)(2) a compatible anion having up to 100 nonhydrogen atoms and containing at least one substituent comprising a moiety having an active hydrogen; and
   (c) phosphinimine/substituted cyclopentadienyl organometallic complex according to the formula:

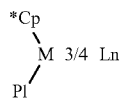

wherein M is a group 4 metal; *Cp is a substituted eta-5 bonded cyclopentadienyl ligand which contains from 7 to 30 carbon atoms; PI is a phosphinimine ligand; L is a leaving group ligand; and n is 1 or 2, depending upon the valence of m, with the further provisos that:
  a) said catalyst contains from 1 to 2,000 mu.mol of activator compound per gram of support material; and
  b) *Cp is selected from the group consisting of 2-pentafluorophenyl cyclopentadienyl, tri-butyl-2- pentafluorophenyl cyclopentadienyl and 2-pentafluorophenyl indenyl.

2. The supported catalyst of claim 1 wherein M is Ti.

* * * * *